United States Patent
Yin et al.

(10) Patent No.: US 11,422,605 B2
(45) Date of Patent: Aug. 23, 2022

(54) POWER CONSUMPTION EXCEPTION PROMPT METHOD, SERVER, AND TERMINAL

(71) Applicant: Huawei Technologies Co., Ltd., Shenzhen (CN)

(72) Inventors: Jie Yin, Shanghai (CN); Shen Cao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/056,358

(22) PCT Filed: May 17, 2018

(86) PCT No.: PCT/CN2018/087289
§ 371 (c)(1),
(2) Date: Nov. 17, 2020

(87) PCT Pub. No.: WO2019/218299
PCT Pub. Date: Nov. 21, 2019

(65) Prior Publication Data
US 2021/0208662 A1 Jul. 8, 2021

(51) Int. Cl.
*G06F 1/32* (2019.01)
*G06F 1/3209* (2019.01)
*H04L 67/01* (2022.01)

(52) U.S. Cl.
CPC ............ *G06F 1/3209* (2013.01); *H04L 67/42* (2013.01)

(58) Field of Classification Search
CPC ............................... G06F 1/3209; H04L 67/42
(Continued)

(56) References Cited

U.S. PATENT DOCUMENTS

2013/0031385 A1* 1/2013 Seto .................... G06F 1/28
713/300
2015/0026487 A1* 1/2015 Choi .................. G06F 9/4893
713/300

(Continued)

FOREIGN PATENT DOCUMENTS

CN 104166615 A 11/2014
CN 104298336 A 1/2015
(Continued)

OTHER PUBLICATIONS

Kim et al., "MODELZ: Monitoring, Detection, and Analysis of Energy-Greedy Anomalies in Mobile Handsets," IEEE Transactions on Mobile Computing, vol. 10, No. 7, pp. 968-981 (Jul. 2011).
(Continued)

*Primary Examiner* — Robert A Cassity
(74) *Attorney, Agent, or Firm* — Leydig, Voit & Mayer, Ltd.

(57) ABSTRACT

A power consumption exception prompt method includes: receiving, by a server, report information sent by a terminal, where the report information includes running information of a first application program on the terminal and power consumption of the first application program on the terminal, and the first application program is any application program on the terminal; determining, by the server based on the report information, whether the power consumption of the first application program on the terminal is abnormal; and when determining that the power consumption of the first application program on the terminal is abnormal, sending, by the server, prompt information to the terminal, where the prompt information is used to indicate that the power consumption of the first application program on the terminal is abnormal.

20 Claims, 3 Drawing Sheets

(58) Field of Classification Search
USPC .......................................................... 713/310
See application file for complete search history.

(56) References Cited

U.S. PATENT DOCUMENTS

| | | | | |
|---|---|---|---|---|
| 2016/0048682 A1* | 2/2016 | Gou | ........................ | G06F 1/329 726/22 |
| 2016/0073351 A1* | 3/2016 | Cardozo | ................... | G06F 1/28 455/574 |
| 2016/0209906 A1* | 7/2016 | Chae | ........................ | G06F 1/329 |
| 2016/0252944 A1* | 9/2016 | Kim | .......................... | G06F 1/28 713/340 |
| 2019/0361513 A1* | 11/2019 | Tomoda | ................ | G06F 1/3296 |

FOREIGN PATENT DOCUMENTS

| | | |
|---|---|---|
| CN | 105138104 A | 12/2015 |
| CN | 105138105 A | 12/2015 |
| CN | 105159816 A | 12/2015 |
| CN | 105373482 A | 3/2016 |
| CN | 105764085 A | 7/2016 |
| CN | 106383571 A | 2/2017 |
| CN | 107861855 A | 3/2018 |
| WO | 2017198025 A1 | 11/2017 |
| WO | 2018161842 A1 | 9/2018 |

OTHER PUBLICATIONS

Liu et al., "VirusMeter: Preventing Your Cellphone from Spies," ICIAP, pp. 244-254 (2009).

Qadri et al., "A review of Significance of Energy-Consumption Anomaly in Malware Detection in Mobile Devices," Intl. Journal on Cyber Situational Awareness, vol. 1, No. 1, pp. 1-21 (2016).

* cited by examiner

POWER CONSUMPTION EXCEPTION PROMPT METHOD, SERVER, AND TERMINAL

CROSS-REFERENCE TO RELATED APPLICATIONS

This application is a National Stage of International Application No. PCT/CN2018/087289, filed on May 17, 2018, which is hereby incorporated by reference in its entirety.

TECHNICAL FIELD

This application relates to the field of terminal technologies, and in particular, to a power consumption exception prompt method, a server, and a terminal.

BACKGROUND

As the mobile phone industry rapidly develops, there are larger storage space for a mobile phone to install more application programs, and power consumption increases. There is a higher requirement on a battery life of the mobile phone. The power consumption of an application program on the mobile phone significantly affects the battery life of the mobile phone. Monitoring the power consumption of the application program may reduce the power consumption, and enhance the battery life of the mobile phone.

Currently, a threshold is set to periodically monitor the power consumption of the application program. When the power consumption exceeds the threshold, the mobile phone displays power consumption exception prompt information, to inform a user about a power consumption exception.

In the solution in which the threshold is set to monitor the power consumption of the application program, power consumption of application programs on mobile phones of different users is different. As a result, the threshold is difficult to set and inaccurate. Therefore, the solution cannot accurately determine the power consumption exception in the application program, and the exception is likely falsely determined.

SUMMARY

In view of this, a first aspect of the embodiments of this application provides a power consumption exception prompt method, including: receiving, by a server, report information sent by a terminal, where the report information includes running information of a first application program on the terminal and power consumption of the first application program on the terminal, and the first application program is any application program on the terminal; determining, by the server based on the report information, whether the power consumption of the first application program on the terminal is abnormal; and when determining that the power consumption of the first application program on the terminal is abnormal, sending, by the server, prompt information to the terminal, where the prompt information is used to indicate that the power consumption of the first application program on the terminal is abnormal, and the running information includes at least one of foreground running duration, background running duration, download traffic, a multimedia file download format, and a multimedia file download volume.

It can be learned from the foregoing technical solutions that the embodiments of this application have the following advantages: the power consumption exception in the application program is determined based on the running information and the power consumption that are of the application program and that are reported by the terminal, and power consumption exception prompt information is sent to the terminal, so that the terminal can restart or disable the application program with the power consumption exception in time. Therefore, the technical solution of this application can improve accuracy of determining the power consumption exception in the application program, and reduce falsely determining the power consumption exception in the application program. In addition, abnormal power consumption in the terminal is reduced, power of the terminal is saved, and a battery life of the terminal is prolonged.

In an implementation of the first aspect, the determining, by the server based on the report information, whether the power consumption of the first application program on the terminal is abnormal includes: querying, by the server, a first relationship table, to obtain a power consumption range corresponding to the running information of the first application program on the terminal; determining, by the server, whether the power consumption of the first application program on the terminal falls within the power consumption range corresponding to the running information of the first application program on the terminal; and when the power consumption of the first application program on the terminal exceeds the power consumption range corresponding to the running information of the first application program on the terminal, determining, by the server, that the power consumption of the first application program on the terminal is abnormal. Otherwise, the server determines that the power consumption of the first application program on the terminal is normal.

In an implementation of the first aspect, the determining, by the server based on the report information, whether the power consumption of the first application program on the terminal is abnormal includes: determining, by the server, a terminal type of the terminal based on the running information of the first application program on the terminal, where the terminal type includes at least two terminal types, and each terminal type corresponds to one power consumption range; determining, by the server, a power consumption range corresponding to the terminal type of the terminal; and determining, by the server based on the power consumption range corresponding to the terminal type of the terminal and the power consumption of the first application program on the terminal, whether the power consumption of the first application program is abnormal.

In an implementation of the first aspect, the at least two terminal types include a heavy running type and a light running type, a power consumption range corresponding to the heavy running type is a first power consumption range, and a power consumption range corresponding to the light running type is a second power consumption range.

In an implementation of the first aspect, if the terminal type of the terminal is the heavy running type, the determining, by the server based on the power consumption range corresponding to the terminal type of the terminal and the power consumption of the first application program on the terminal, whether the power consumption of the first application program on the terminal is abnormal includes: if the power consumption of the first application program on the terminal exceeds the first power consumption range, determining, by the server, that the power consumption of the first application program on the terminal is abnormal, or if the power consumption of the first application program on the terminal does not exceed the first power consumption range, determining, by the server, that the power consumption of the first application program on the terminal is normal.

In an implementation of the first aspect, if the terminal type of the terminal is the light running type, the determining, by the server based on the power consumption range corresponding to the terminal type of the terminal and the power consumption of the first application program on the terminal, whether the power consumption of the first application program on the terminal is abnormal includes: if the power consumption of the first application program on the terminal exceeds the second power consumption range, determining, by the server, that the power consumption of the first application program on the terminal is abnormal, or if the power consumption of the first application program on the terminal does not exceed the second power consumption range, determining, by the server, that the power consumption of the first application program on the terminal is normal.

A second aspect of the embodiments of this application provides a power consumption exception prompt method, including: sending, by a terminal, report information to a server, where the report information includes running information of a first application program on the terminal and power consumption of the first application program on the terminal, and the first application program is any application program on the terminal; and when the terminal receives prompt information sent by the server, processing, by the terminal, a power consumption exception in the first application program, where the prompt information indicates that the power consumption of the first application program on the terminal is abnormal.

It should be noted that beneficial effects of the second aspect are similar to the effects of the first aspect, and details are not described herein again.

In an implementation of the second aspect, the sending, by a terminal, report information to a server includes: periodically sending, by the terminal, the report information to the server based on a preset period; or sending, by the terminal, the report information to the server when a preset trigger condition is met.

In an implementation of the second aspect, the processing, by the terminal, a power consumption exception in the first application program includes: disabling, by the terminal, the first application program; restarting, by the terminal, the first application program; or displaying, by the terminal, power consumption exception information about the first application program to a user.

A third aspect of the embodiments of this application provides a server, including: a receiving module, configured to receive report information sent by a terminal, where the report information includes running information of a first application program on the terminal and power consumption of the first application program on the terminal, the first application program is any application program on the terminal; a determining module, configured to determine, based on the report information, whether the power consumption of the first application program on the terminal is abnormal; and a sending module, configured to send prompt information to the terminal when determining that the power consumption of the first application program on the terminal is abnormal, where the prompt information indicates that the power consumption of the first application on the terminal is abnormal.

In an implementation of the third aspect, the determining module is specifically configured to: query a first relationship table, to obtain a power consumption range corresponding to the running information of the first application program on the terminal; and determine, when the power consumption of the first application program on the terminal exceeds the power consumption range corresponding to the running information of the first application program on the terminal, whether the power consumption of the first application program on the terminal is abnormal.

In an implementation of the third aspect, the determining module is specifically configured to: determine a terminal type of the terminal based on the running information of the first application program on the terminal, where the terminal type includes at least two terminal types, and each terminal type corresponds to one power consumption range; determine a power consumption range corresponding to the terminal type of the terminal; and determine, based on the power consumption range corresponding to the terminal type of the terminal and the power consumption of the first application program on the terminal, whether the power consumption of the first application program is abnormal.

In an implementation of the third aspect, the at least two terminal types include a heavy running type and a light running type, a power consumption range corresponding to the heavy running type is a first power consumption range, and a power consumption range corresponding to the light running type is a second power consumption range.

In an implementation of the third aspect, if the terminal type of the terminal is the heavy running type, the determining module is specifically configured to: if the power consumption in the terminal exceeds the first power consumption range, determine that the power consumption of the first application program on the terminal is abnormal, or if the power consumption in the terminal does not exceed the first power consumption range, determine that the power consumption of the first application program on the terminal is normal.

In an implementation of the third aspect, if the terminal type of the terminal is the light running type, the determining module is specifically configured to: if the power consumption in the terminal exceeds the second power consumption range, determine that the power consumption of the first application program on the terminal is abnormal, or if the power consumption in the terminal does not exceed the second power consumption range, determine that the power consumption of the first application program on the terminal is normal.

A fourth aspect of the embodiments of this application provides a terminal, including: a sending module, configured to send report information to a server, where the report information includes running information of a first application program on the terminal and power consumption of the first application program on the terminal, and the first application program is any application program on the terminal; and a processing module, configured to: when the terminal receives prompt information sent by the server, process a power consumption exception in the first application program, where the prompt information indicates the power consumption of the first application program on the terminal is abnormal.

In an implementation of the fourth aspect, the sending module is specifically configured to periodically send the report information to the server based on a preset period; or send the report information to the server when a preset trigger condition is met.

In an implementation of the fourth aspect, the processing module is specifically configured to: disable the first application program, restart the first application program, or display power consumption exception information about the first application program to a user.

A fifth aspect of the embodiments of this application provides a server, including a memory, a processor, and a transceiver. The transceiver is configured to perform a receiving or sending operation, the memory is configured to store an operation instruction, and the memory is configured to invoke the operation instruction, to perform the power consumption exception prompt method in the first aspect.

A sixth aspect of the embodiments of this application provides a terminal, including a memory, a processor, and a transceiver. The transceiver is configured to perform a receiving or sending operation, the memory is configured to store an operation instruction, and the memory is configured to invoke the operation instruction, to perform the power consumption exception prompt method in the second aspect.

A seventh aspect of the embodiments of this application provides a computer storage medium. The computer storage medium includes an operation instruction. When the operation instruction is run on a computer, the computer is enabled to perform the power consumption exception prompt method in the first aspect.

An eighth aspect of the embodiments of this application provides another computer storage medium. The computer storage medium includes an operation instruction. When the operation instruction is run on a computer, the computer is enabled to perform the power consumption exception prompt method in the second aspect.

A ninth aspect of the embodiments of this application provides a computer program product. When the computer program product runs on a computer, the computer is enabled to perform all operations in the first aspect.

A tenth aspect of the embodiments of this application provides another computer program product. When the computer program product runs on a computer, the computer is enabled to perform all operations in the second aspect.

For other descriptions of the third aspect to the tenth aspect, refer to the related descriptions and effects in the first aspect or the second aspect. Details are not described herein again.

BRIEF DESCRIPTION OF DRAWINGS

To describe the technical solutions in embodiments of this application more clearly, the following briefly describes the accompanying drawings required for describing the embodiments. Apparently, the accompanying drawings in the following description show merely some embodiments of this application, and persons of ordinary skill in the art may still derive other drawings from these accompanying drawings without creative efforts.

DESCRIPTION OF EMBODIMENTS

Embodiments of this application provide a power consumption exception prompt method, a server, and a terminal, to accurately identify a power consumption exception in an application program, and reduce falsely determining the power consumption exception in the application program.

The following clearly and completely describes the technical solutions in this application with reference to the accompanying drawings in the embodiments of this application. Apparently, the described embodiments are merely some but not all of the embodiments of this application.

In the specification, claims, and accompanying drawings of embodiments of this application, the terms "first", "second", "third", "fourth", and so on (if existent) are intended to distinguish between similar objects but do not necessarily indicate a specific order or sequence. It should be understood that the data used in such a way are interchangeable in appropriate circumstances, so that the embodiments described herein can be implemented in other orders than the content illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

The embodiments of this application are applicable to accurately identifying an exception occurred on the application program and abnormal power consumption in the application program, so as to instruct a system or a user to process correspondingly. In the embodiments of this application, the power consumption exception is mainly determined based on a matching degree between power consumption in the application program in a running process and corresponding power consumption. It may be understood that if the power consumption does not match the power consumption or the matching degree is low, it may be considered that the power consumption in the application program is abnormal. The terminal in the embodiments of this application is not limited to a common device such as a mobile phone, a tablet computer, a notebook computer, or a desktop computer, or may be another computer device having a running application program.

Figure 1:
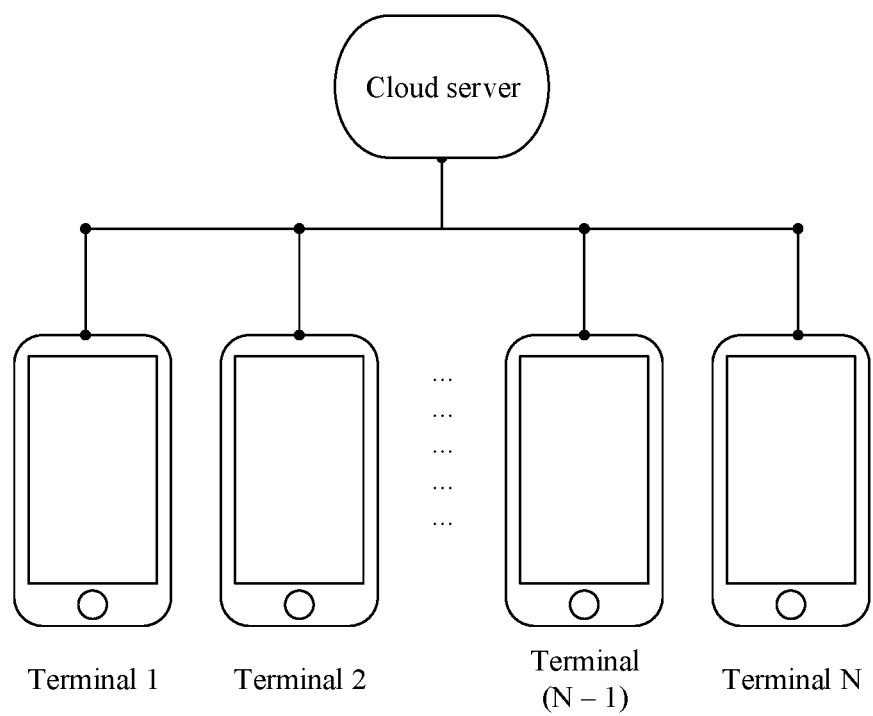
FIG. 1 is a schematic diagram of a system framework of a power consumption exception prompt method according to an embodiment of this application.

FIG. 1 is a schematic diagram of a system framework of a power consumption exception prompt method according to an embodiment of this application. FIG. 1 shows a cloud server and N terminals, where N is an integer greater than 2. The cloud server is configured to collect a large amount of running information and power consumption of different types of application programs in a running process on the N terminals. Further, the cloud server analyzes big data based on the collected running information and the collected power consumption, to obtain a correspondence between the running information and the power consumption. Finally, the cloud server determines, based on the correspondence, together with the running information and the power consumption of the application program running on each terminal, that the power consumption in the application program is abnormal, and notify the terminal. Each terminal is configured to report the running information and the power consumption of the application program to the cloud server, and after receiving a power consumption exception message sent by the cloud server, process the power consumption exception in the application program, for example, "freeze" the application program, restart the application program, or stop running the application program.

To facilitate understanding of more details about the power consumption exception prompt method in this embodiment of this application, the following describes the power consumption exception prompt method in detail with reference to specific embodiments.

Figure 2:
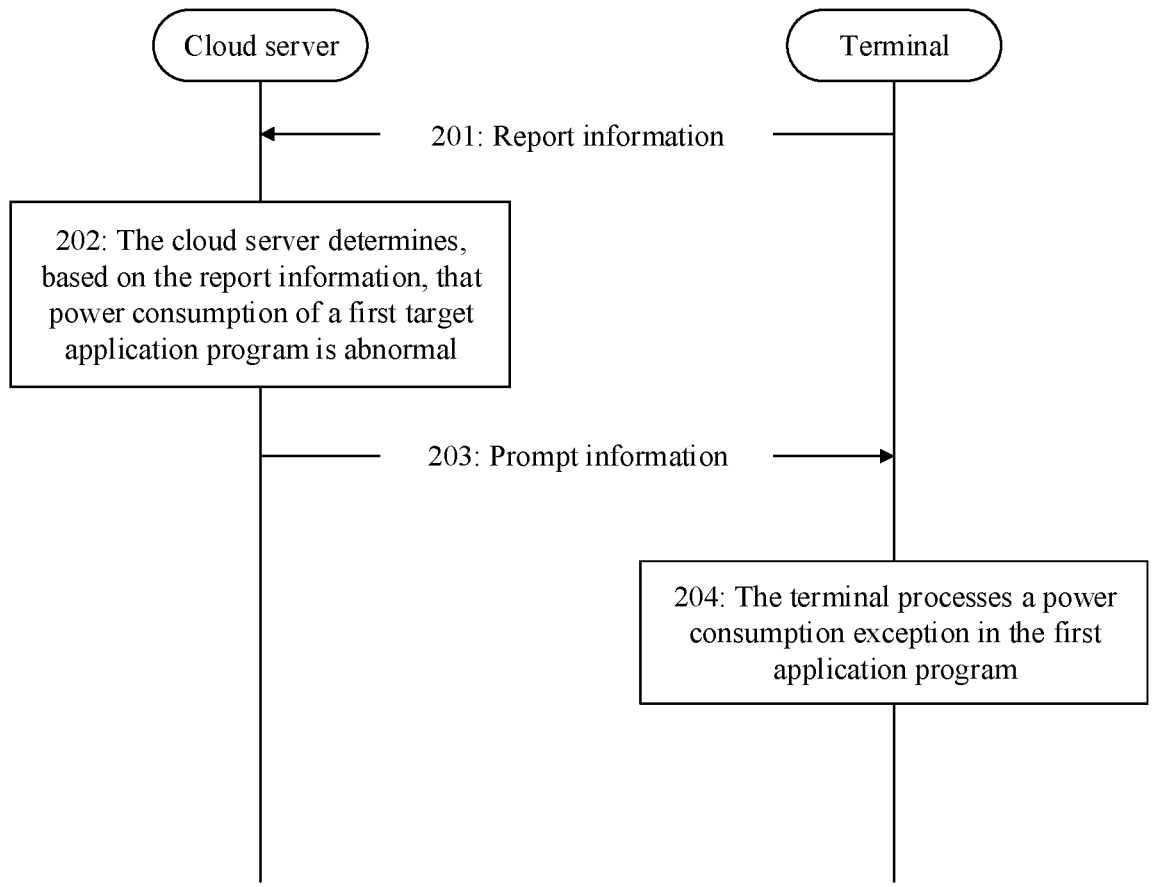
FIG. 2 is a schematic diagram of an embodiment of a power consumption exception prompt method according to an embodiment of this application.

FIG. 2 is a schematic diagram of an embodiment of a power consumption exception prompt method according to an embodiment of this application. As shown in FIG. 2, the power consumption exception prompt method includes:

201: A terminal sends report information to a cloud server.

The report information includes running information of a first application program on the terminal and power consumption of the first application program on the terminal. The first application program may be any application program running on the terminal. The running information of the first application program indicates corresponding power consumption action information when the first application program runs on the terminal. Likewise, the power consumption of the first application program indicates corresponding power consumption when the first application program runs on the terminal. The running information may be specifically at least one piece of information of foreground running duration, background running duration, traffic usage, a multimedia file download format, and a multimedia file download volume.

It should be noted that, different application programs correspond to same or different running information. For example, running information of an application program of a download type includes at least one of foreground running duration, background running duration, traffic usage, and a data download volume of the application program, and running information of an application program of a multimedia playing type includes at least one of foreground running duration, background running duration, traffic usage, a multimedia file download format, and a multimedia file download volume of the application program. It should be noted that, in addition to the two types of application programs of the download type and the multimedia playing type, the first application program may further be an application program of another type. This is not limited herein.

In an example, a preset period is preset. The terminal periodically reports to the cloud server based on the preset period, the running information and the power consumption when the first application program runs on the terminal. For example, the preset period may be two seconds, or may be another appropriate value. This is not limited herein.

In another example, a trigger condition is preset. When the trigger condition is met, the terminal reports to the cloud server the running information and the power consumption when the first application program runs on the terminal. For example, the trigger condition is that the power consumption of the first application program reaches 100 mAh. When the power consumption of the first application program running on the terminal reaches 100 mAh, the terminal reports to the cloud server the running information and the power consumption when the first application program runs.

202: The cloud server determines, based on the report information, that the power consumption of the first target application program on the terminal is abnormal.

In an example, the cloud server stores a pre-collected first relationship table, and the first relationship table includes a correspondence that is between the running information and the power consumption of the first application program and that is obtained through big data statistics collection. The cloud server queries, in the first correspondence table, a power consumption range corresponding to the running information of the first application program on the terminal. It should be understood that the power consumption range obtained through query is a normal power consumption range. The cloud server determines, based on the normal power consumption range and the power consumption of the first application program on the terminal, whether a power consumption exception exists when the first application program runs on the terminal.

Further, that the cloud server determines whether the power consumption of the first application program is abnormal may be specifically: If the power consumption of the first application program on the terminal falls within the normal power consumption range, the cloud server determines that the power consumption of the first application program is normal; or if the power consumption of the first application program on the terminal exceeds the normal power consumption range, the cloud server determines that the power consumption of the first application program is abnormal.

In another example, that the cloud server determines, based on the report information, that the power consumption of the first application program on the terminal is abnormal may be specifically: The cloud server determines a terminal type of the terminal based on the running information of the first application program on the terminal, where the terminal type includes two or more types, and each terminal type corresponds to one power consumption range. The cloud server obtains a power consumption range corresponding to the terminal type of the terminal. The cloud server determines, based on the power consumption range corresponding to the terminal type of the terminal and the power consumption of the first application program on the terminal, whether the power consumption of the first application program is abnormal. A specific determining method is similar to the determining method in the foregoing example. Details are not described herein again.

Different application programs may correspond to different running information. For example, running information corresponding to a music playing application program may include foreground running time duration, background running time duration, a played music file format, music playing duration, volume, and the like, and running information corresponding to a video playing application program may include foreground running time, background running time, a played video file format, video resolution, and the like.

Two terminal types are used as an example. The terminal types may be classified into a heavy running type and a light running type based on a use degree of the first application program, and the terminal of the heavy running type is used longer than the terminal of the light running type. Compared with that of the light running type, a value corresponding to running information such as foreground running duration and background running duration corresponding to the heavy running type is comparatively large. A power consumption range corresponding to the heavy running type is a first power consumption range. A power consumption range corresponding to the light running type is a second power consumption range. The first power consumption range is different from the second power consumption range. There is no intersection between the first power consumption range and the second power consumption range. A minimum value of the first power consumption range is greater than a maximum value of the second power consumption range.

For example, when the terminal type of the terminal is the heavy running type, if the power consumption of the first application program falls within the first power consumption range, the cloud server determines that the power consumption of the first application program on the terminal is normal. Otherwise, the cloud server determines that the power consumption of the first application program on the terminal is abnormal. Likewise, when the terminal type of the terminal is the light running type, if the power consumption of the first application program falls within the second power consumption range, the cloud server determines that the power consumption of the first application program on the terminal is normal. Otherwise, the cloud server determines that the power consumption of the first application program on the terminal is abnormal.

It should be noted that different application programs running on a same terminal have different use degrees of different application programs. Therefore, the different application programs may correspond to different terminal types. For example, there is an application program A and an application program B running on the terminal. For the application program A, the terminal type of the terminal is the heavy running type, and for the application program B, the terminal type of the terminal is the light running type. Similarly, each time same application programs are run, the application programs may correspond to a same terminal type of the terminal or different terminal types of the terminals each time.

Therefore, the terminal type in this embodiment of this application is obtained through division based on the running information of the application program each time, and should be different from a common terminal type. Likewise, in an actual application process, to improve accuracy of determining the power consumption exception or achieve other technical effects, more than two terminal types may be further classified based on the running information. This is not limited in this application.

For example, as shown in FIG. 1, for a short description, it is assumed that only two pieces of running information: the foreground running duration and the background running duration, are used as a classification criterion. A sum of the foreground running duration and the background running duration is total running duration. For example, when the total running duration exceeds 2 hours, the terminal type is the heavy running type. Otherwise, the terminal is the light running type. If a terminal 1 and a terminal 2 simultaneously run video playing software, for example, a Huawei video playing client, total running duration of using the Huawei video playing client on the terminal 1 is one hour, and total running duration of using the Huawei video playing client on the terminal 2 reaches three hours, in this case, the cloud server determines that a terminal type of the terminal 1 is the light running type, and determines that a terminal type of the terminal 2 is the heavy running type. In another scenario, if total running duration of running a Huawei video playing client on the terminal 1 is 3 hours, in this case, the cloud server determines that a terminal type of the terminal 1 is the heavy running type. Similarly, if a Youku video client is run on the terminal 1 for 1.5 hours, in this case, the cloud server determines that a terminal type of the terminal 1 is the light running type.

203: The cloud server sends prompt information to the terminal, where the prompt information is used to inform the power consumption exception in a target program on the terminal.

When the cloud server determines that the power consumption of the first application program on the terminal is abnormal, the cloud server sends the prompt information to the terminal. It should be noted that when the cloud server determines, based on the report information, that the power consumption of the first application program on the terminal is normal, the cloud server may not perform any operation, or may send a notification message to the terminal, where the notification message is used to notify the terminal that the power consumption of the first application program running on the terminal is normal. This is not limited.

204: The terminal processes the power consumption exception in the first application program.

When the terminal receives the power consumption exception prompt information sent by the cloud server, the terminal may process the power consumption exception in the following manner: disabling the first application program, restarting the first application program, or displaying a message about the power consumption exception in the first application program to a user, and performing a corresponding operation according to an instruction of the user.

In this embodiment of this application, based on the running information and the power consumption of the application program, and the first relationship table obtained through the big data statistics collection or the first power consumption range or the second power consumption range, the cloud server determines that the power consumption of the application program is abnormal and sends the power consumption exception prompt information to the terminal, so that the terminal can restart or disable the application program with the power consumption exception in time. Therefore, the technical solution of this application can improve accuracy of determining the power consumption exception in the application program, and reduce falsely determining the power consumption exception in the application program. In addition, abnormal power consumption in the terminal is reduced, power of the terminal is saved, and a battery life of the terminal is prolonged.

To further understand the power consumption exception prompt method in this embodiment of this application, the following describes in detail with reference to FIG. 1, a specific scenario to which the power consumption exception prompt method is applied. Details are as follows:

The terminal 1 to a terminal N are specifically a mobile phone 1 to a mobile phone N. The user downloads a 1 GB file by using a downloader M installed on the mobile phone 1, and power consumption Xp1 exceeds the preset threshold. The mobile phone 1 reports running action information, for example, Xt1, Xt2, and Xd1, and the power consumption Xp1 in the download process to the cloud server, where Xt1 is foreground running duration of the downloader M, Xt2 is background running duration of the downloader M, and Xd1 is a data access volume of the downloader M.

The cloud server stores historical data of running action information of the downloader M, and the historical data is reference data obtained based on data uploaded by at least one of the mobile phone 1 to the mobile phone N. The cloud server compares the report information from the mobile phone 1 in this download with the historical data, and determines whether a power consumption exception exists in the download action of the downloader M on the mobile phone 1. A specific determining method is as follows:

For power consumption action of running the downloader M on the mobile phone 1, the cloud server performs modeling according to a U1=F (Xt1, Xt2, Xd1) model by using (Xt1, Xt2, Xd1, and Xp1) to obtain U1, where U1 indicates usage or a use degree of the user for the mobile phone 1 in the download process, and the usage or the usage degree U1 is used to represent a running degree of the downloader M. A larger value of U1 indicates a higher running degree of the downloader M, or indicates a higher use degree of the downloader M. Further, according to a formula N1=Xp1/U1, power consumption corresponding to per usage of the downloader M is obtained. The cloud server determines, based on the value of U1, that the use degree of the download action in this time on the mobile phone 1 is heavy use (to be specific, a terminal type of the mobile phone 1 is the heavy running type) or light use (to be specific, a terminal type of the mobile phone 1 is the light running type). Then, the cloud server compares a unit usage power consumption threshold Nth corresponding to the heavy use with N1, or the cloud server compares a unit usage power consumption threshold Nth corresponding to the light use with N1, to determine whether the power consumption exception exists in the download action of running the downloader M on the mobile phone 1. For example, if the cloud server determines, based on U1, that the download in the mobile phone 1 is the heavy use, and the per usage power consumption threshold Nth corresponding to the heavy use is less than N1, the cloud server determines that the power consumption exception exists in the download action, and sends the power consumption exception prompt information to the mobile phone 1, so that the mobile phone 1 "freezes" the downloader M, restarts the downloader M, or stops running the downloader M.

The foregoing describes in detail the power consumption exception prompt method provided in the embodiments of this application. The following describes in detail a server and a terminal provided in the embodiments of this application.

Figure 3:
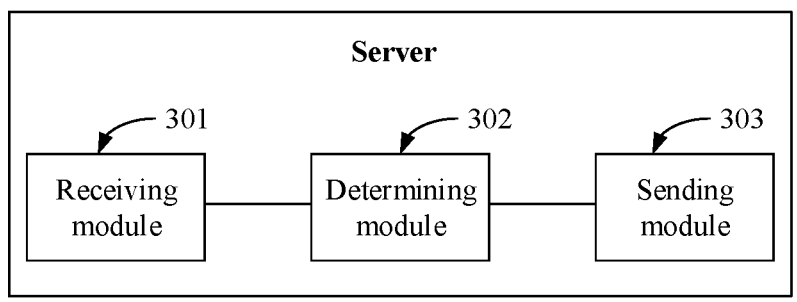
FIG. 3 is a schematic structural diagram of a server according to an embodiment of this application.

FIG. 3 is a schematic structural diagram of a server according to an embodiment of this application. As shown in FIG. 3, an embodiment of the server in this embodiment of this application includes:

- a receiving module 301, configured to receive report information sent by a terminal, where the report information includes running information of a first application program on the terminal and power consumption of the first application program on the terminal, the first application program is any application program on the terminal, and the running information includes at least one of foreground running duration, background running duration, download traffic, a multimedia file download format, and a multimedia file download volume;
- a determining module 302, configured to determine, based on the report information, whether the power consumption of the first application program on the terminal is abnormal; and
- a sending module 303, configured to send prompt information to the terminal when determining that the power consumption of the first application program on the terminal is abnormal, where the prompt information is used to indicate that the power consumption of the first application on the terminal is abnormal.

In an example, the determining module 302 is specifically configured to query a first relationship table, to obtain a power consumption range corresponding to the running information of the first application program on the terminal; determine whether the power consumption of the first application program on the terminal falls within the power consumption range corresponding to the running information of the first application program on the terminal; and when the power consumption of the first application program on the terminal exceeds the power consumption range corresponding to the running information of the first application program on the terminal, determine that the power consumption of the first application program on the terminal is abnormal.

In an example, the determining module 302 is specifically configured to determine a terminal type of the terminal based on the running information of the first application on the terminal, where the terminal type includes at least two terminal types, and each terminal type corresponds to one power consumption range; determine a power consumption range corresponding to the terminal type of the terminal; and determine, based on the power consumption range corresponding to the terminal type of the terminal and the power consumption of the first application on the terminal, whether the power consumption of the first application is abnormal.

In an example, the at least two terminal types include a heavy running type and a light running type, a power consumption range corresponding to the heavy running type is a first power consumption range, and a power consumption range corresponding to the light running type is a second power consumption range.

In an example, if the terminal type of the terminal is the heavy running type, the determining module 302 is specifically configured to: if the power consumption in the terminal exceeds the first power consumption range, determine that the power consumption of the first application program on the terminal is abnormal; or if the power consumption in the terminal does not exceed the first power consumption range, determine that the power consumption of the first application program on the terminal is normal.

In an example, if the terminal type of the terminal is the light running type, the determining module 302 is specifically configured to: if the power consumption in the terminal exceeds the second power consumption range, determine that the power consumption of the first application program on the terminal is abnormal; or if the power consumption in the terminal does not exceed the second power consumption range, determine that the power consumption of the first application program on the terminal is normal.

It should be noted that for other related descriptions in the foregoing several examples, refer to related descriptions in step 202 in FIG. 2. Details are not described herein again.

In this embodiment of this application, the server may specifically correspond to the cloud server in FIG. 2. For other related descriptions of the server in FIG. 3, refer to related descriptions of the cloud server in FIG. 2. Details are not described herein again.

Figure 4:
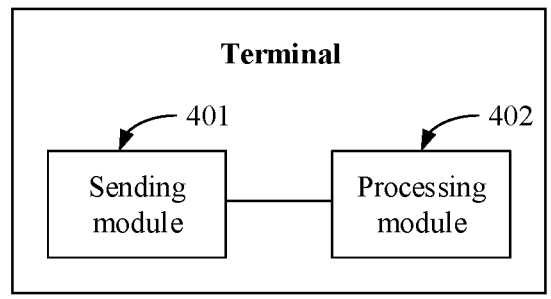
FIG. 4 is a schematic structural diagram of a terminal according to an embodiment of this application.

FIG. 4 is a schematic structural diagram of a terminal according to an embodiment of this application. As shown in FIG. 4, the terminal provided in this embodiment of this application includes:

- a sending module 401, configured to send report information to a server, where the report information includes running information of a first application program on the terminal and power consumption of the first application program on the terminal, and the first application program is any application program on the terminal;
- a processing module 402, configured to: when the processing module receives prompt information sent by the server, process a power consumption exception in the first application program, where the prompt information is used to indicate that the power consumption of the first application program on the terminal is abnormal.

In an example, the sending module 401 is specifically configured to periodically send the report information to the server based on a preset period, or when a preset trigger condition is met, send the report information to the server. For related descriptions in this example, refer to related descriptions of step 201 in FIG. 2. Details are not described herein again.

In an example, the processing module 402 is specifically configured to disable the first application program, restart the first application program, or display power consumption exception information about the first application program to a user. For related descriptions in this example, refer to related descriptions of step 204 in FIG. 2. Details are not described herein again.

For other descriptions of the terminal in this embodiment of this application, refer to related descriptions of the power consumption exception prompt method part corresponding to FIG. 2. Details are not described herein again.

Figure 5:
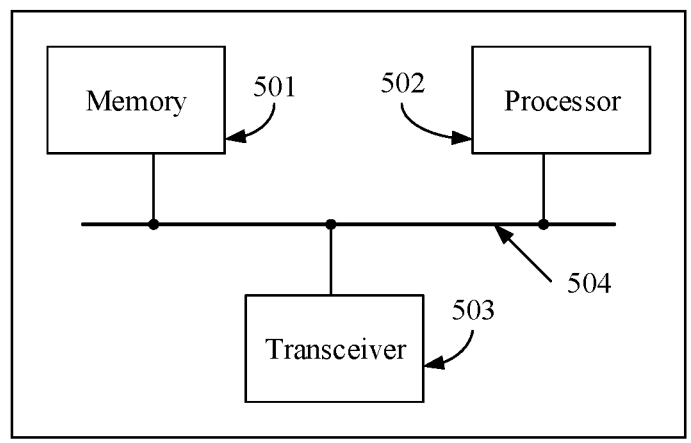
FIG. 5 is a schematic structural diagram of an apparatus according to an embodiment of this application.

FIG. 5 is a schematic structural diagram of an apparatus. The apparatus shown in FIG. 5 may represent the server in the embodiments of this application, or may represent the terminal in the embodiments of this application.

As shown in FIG. 5, the server or the terminal includes a memory 501, a processor 502, a transceiver 503, and a bus system 504. The bus system 504 is configured to connect the memory 501, the processor 502, and the transceiver 503. The transceiver 503 is configured to perform a receiving or sending operation. The memory 502 is configured to store an operation instruction. The processor 502 is configured to invoke the operation instruction in the memory 502 to perform a corresponding operation.

The memory 501 may include a read-only memory and a random access memory, and provide an instruction and data to the processor 502. A part of the memory 501 may further include a non-volatile random access memory (NVRAM). The memory 501 stores the following elements: an executable module or a data structure, or a subset thereof, or an extension set thereof; the operation instruction including various operation instructions used to perform various operations; and an operating system including various system programs used to implement various basic services and process a hardware-based task.

The processor 502 may also be referred to as a central processing unit (CPU). The memory 501 may include the read-only memory and the random access memory, and provide the instruction and the data to the processor 502. The part of the memory 501 may further include the NVRAM. In a specific application, components of the apparatus are coupled together by using the bus system 504. In addition to a data bus, the bus system further includes a power bus, a control bus, a status signal bus, and the like. However, for clear description, various types of buses in the figure are marked as the bus system 504.

The power consumption exception prompt methods disclosed in the foregoing embodiments of this application may be applied to the processor 502, or may be implemented by the processor 502. The processor 502 may be an integrated circuit chip and has a power consumption exception detection capability. In an implementation process, steps in the foregoing methods can be completed by using an integrated logic circuit of hardware, or by using instructions in a form of software in the processor 502. The processor 502 may be a general purpose processor, a digital signal processor (DSP), an application-specific integrated circuit (ASIC), a field programmable gate array (FPGA) or another programmable logic component, a discrete gate or transistor logic device, or a discrete hardware component. The processor 502 may implement or perform the methods, the steps, and logical block diagrams disclosed in the embodiments of this application. The general-purpose processor may be a microprocessor, the processor may be any conventional processor, or the like. Steps of the methods disclosed with reference to the embodiments of this application may be directly performed and completed by using a hardware decoding processor, or may be performed and completed by using a combination of hardware and a software module in a decoding processor. The software module may be located in a mature storage medium in the art, such as a random access memory, a flash memory, a read-only memory, a programmable read-only memory, an electrically erasable programmable memory, or a register. The storage medium is located in the memory 501, and the processor 502 reads information in the memory 501 and completes the step in the foregoing method in combination with hardware of the processor.

When the apparatus in FIG. 5 is the server in the embodiments of this application, the processor 502 invokes the operation instruction in the memory 501 to perform an operation corresponding to the server in the power consumption exception prompt method. When the apparatus in FIG. 5 is the terminal in the embodiments of this application, the processor 502 invokes the operation instruction in the memory 501 to perform an operation corresponding to the terminal in the power consumption exception prompt method.

For related descriptions of FIG. 5, refer to related descriptions and the effects of the power consumption exception prompt method part for understanding. Details are not described herein again.

An embodiment of this application further provides a computer storage medium. The computer storage medium includes an operation instruction. When the operation instruction is run on a computer, the computer is enabled to perform an operation corresponding to the server in the power consumption exception prompt method. When the apparatus in FIG. 5 is the server, the storage medium may be specifically the memory 501.

An embodiment of this application further provides another computer storage medium. The computer storage medium includes an operation instruction. When the operation instruction is run on a computer, the computer is enabled to perform an operation corresponding to the terminal in the power consumption exception prompt method. When the apparatus in FIG. 5 is a terminal, the storage medium may be specifically the memory 501.

An embodiment of this application further provides a computer program product. When the computer program product runs on a computer, the computer is enabled to perform an operation corresponding to the server in the power consumption exception prompt method.

An embodiment of this application further provides another computer program product. When the computer program product runs on a computer, the computer is enabled to perform an operation corresponding to the terminal in the power consumption exception prompt method.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instruction is loaded and executed on the computer, all or some of the procedures or functions in this application are generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium stored by a computer, or a data storage device, such as a server, or a data center, that includes a server integrated with one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

It may be clearly understood by persons skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, division into the unit is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A system, comprising:
  a server that comprises a first processor and a first non-transitory memory coupled to the first processor, wherein the first non-transitory memory stores first computer-readable instructions thereon; and
  a terminal that comprises a second processor and a second non-transitory memory coupled to the second processor, wherein the second non-transitory memory stores second computer-readable instructions thereon;
  wherein the first computer-readable instructions, when executed by the first processor, cause the first processor to:
    receive report information from the terminal, wherein the report information comprises running information of a first application program on the terminal and power consumption of the first application program on the terminal, wherein the first application program is an application program on the terminal, wherein the running information comprises at least one of foreground running duration, background running duration, download traffic, a multimedia file download format, or a multimedia file download volume;
    determine, based on the report information, whether the power consumption of the first application program on the terminal is abnormal; and
    in response to determining that the power consumption of the first application program on the terminal is abnormal, sending prompt information to the terminal, wherein the prompt information is used to indicate that the power consumption of the first application program on the terminal is abnormal, wherein the prompt information is used to cause the terminal to process a power consumption exception in the first application program; and wherein the processing the power consumption exception in the first application program comprises disabling, by the second processor, the first application program, restarting, by the second processor, the first application program, and displaying, by the second processor, information of the power consumption exception of the first application program to a user; and
  wherein the second computer-readable instructions, when executed by the second processor, cause the second processor to:
    send the report information to the server; and
    in response to the terminal receiving the prompt information from the server, process the power consumption exception in the first application program.

2. The system of claim 1, wherein the first processor determining, based on the report information, whether the power consumption of the first application program on the terminal is abnormal, comprises:
  querying a first relationship table to obtain a power consumption range corresponding to the running information of the first application program on the terminal; and
  determining that the power consumption of the first application program on the terminal is abnormal in response to the power consumption of the first application program on the terminal exceeding the power consumption range corresponding to the running information of the first application program on the terminal, wherein the first relationship table is stored on the first non-transitory memory, and the first relationship table includes a correspondence that is between the running information and the power consumption of the first application program.

3. The system of claim 2, wherein the first computer-readable instructions, when executed by the first processor, further cause the first processor to:
  store the first relationship table on the first non-transitory memory.

4. The system of claim 1, wherein the first processor determining, based on the report information, whether the power consumption of the first application program on the terminal is abnormal comprises:
  determining a terminal type of the terminal based on the running information of the first application program on the terminal, wherein the terminal type comprises one of at least two terminal types, and each terminal type corresponds to one power consumption range;

determining a power consumption range corresponding to the terminal type of the terminal; and determining, based on the power consumption range corresponding to the terminal type of the terminal and the power consumption of the first application program on the terminal, whether the power consumption of the first application program is abnormal.

5. The system of claim 4, wherein the at least two terminal types comprise a heavy running type and a light running type, wherein a power consumption range corresponding to the heavy running type of the terminal is a first power consumption range, and wherein a power consumption range corresponding to the light running type of the terminal is a second power consumption range.

6. The system of claim 5, wherein in response to the terminal type of the terminal being the heavy running type, the first processor determining, based on the power consumption range corresponding to the terminal type of the terminal and the power consumption of the first application program on the terminal, whether the power consumption of the first application program on the terminal is abnormal comprises:

in response to the power consumption of the first application program on the terminal exceeding the first power consumption range, determining that the power consumption of the first application program on the terminal is abnormal.

7. The system of claim 5, wherein in response to the terminal type of the terminal being the light running type, the first processor determining, based on the power consumption range corresponding to the terminal type of the terminal and the power consumption of the first application program on the terminal, whether the power consumption of the first application program on the terminal is abnormal comprises:

in response to the power consumption of the first application program on the terminal exceeding the second power consumption range, determining that the power consumption of the first application program on the terminal is abnormal.

8. A power consumption exception prompt method for a server that comprises one or more processors, the method comprising:

receiving, by the one or more processors, report information from a terminal, wherein the report information comprises running information of a first application program on the terminal and power consumption of the first application program on the terminal, wherein the first application program is an application program on the terminal, wherein the running information comprises at least one of foreground running duration, background running duration, download traffic, a multimedia file download format, or a multimedia file download volume;

determining, by the one or more processors, based on the report information, whether the power consumption of the first application program on the terminal is abnormal;

in response to determining that the power consumption of the first application program on the terminal is abnormal, sending, by the one or more processors, prompt information to the terminal, wherein the prompt information indicates that the power consumption of the first application program on the terminal is abnormal, wherein the prompt information is used to cause the terminal to process a power consumption exception in the first application program, and wherein the processing the power consumption exception in the first application program comprises disabling, by one or more processors of the terminal, the first application program, restarting, by the one or more processors of the terminal, the first application program, and displaying, by the one or more processors of the terminal, information of the power consumption exception of the first application program to a user.

9. The method of claim 8, wherein the determining, by the one or more processors, based on the report information, whether the power consumption of the first application program on the terminal is abnormal, comprises:

querying, by the one or more processors, a first relationship table, to obtain a power consumption range corresponding to the running information of the first application program on the terminal; and determining, by the one or more processors, that the power consumption of the first application program on the terminal is abnormal in response to the power consumption of the first application program on the terminal exceeding the power consumption range corresponding to the running information of the first application program on the terminal, wherein the first relationship table is stored on the server, and the first relationship table includes a correspondence that is between the running information and the power consumption of the first application program.

10. The method of claim 9, further comprising:

storing, by the one or more processors, the first relationship table on the server.

11. The method of claim 8, wherein the determining, by the one or more processors, based on the report information, whether the power consumption of the first application program on the terminal is abnormal, comprises:

determining, by the one or more processors, a terminal type of the terminal based on the running information of the first application program on the terminal, wherein the terminal type comprises one of at least two terminal types, and each terminal type corresponds to one power consumption range;

determining, by the one or more processors, a power consumption range corresponding to the terminal type of the terminal; and determining, by the one or more processors, based on the power consumption range corresponding to the terminal type of the terminal and the power consumption of the first application program on the terminal, whether the power consumption of the first application program is abnormal.

12. The method of claim 11, wherein the at least two terminal types comprise a heavy running type and a light running type, wherein a power consumption range corresponding to the heavy running type of the terminal is a first power consumption range, and wherein a power consumption range corresponding to the light running type of the terminal is a second power consumption range.

13. The method of claim 12, wherein in response to the terminal type of the terminal being the heavy running type, the determining, by the one or more processors, based on the power consumption range corresponding to the terminal type of the terminal and the power consumption of the first application program on the terminal, whether the power consumption of the first application program on the terminal is abnormal comprises:

in response to the power consumption of the first application program on the terminal exceeding the first power consumption range, determining, by the one or more processors, that the power consumption of the first application program on the terminal is abnormal.

14. The method of claim 12, wherein in response to the terminal type of the terminal being the light running type, the determining, by the server, based on the power consumption range corresponding to the terminal type of the terminal and the power consumption of the first application program on the terminal, whether the power consumption of the first application program on the terminal is abnormal comprises:

in response to the power consumption of the first application program on the terminal exceeding the second power consumption range, determining, by the one or more processors, that the power consumption of the first application program on the terminal is abnormal.

15. A non-transitory computer readable medium having stored thereon executable instructions that, when executed by one or more processors of a server, cause the one or more processors to:

receive report information received from a terminal, wherein the report information comprises running information of a first application program on the terminal and power consumption of the first application program on the terminal, wherein the first application program is an application program on the terminal, wherein the running information comprises at least one of foreground running duration, background running duration, download traffic, a multimedia file download format, or a multimedia file download volume;

determine, based on the report information, whether the power consumption of the first application program on the terminal is abnormal; and in response to determining that the power consumption of the first application program on the terminal is abnormal, sending prompt information to the terminal, wherein the prompt information is used to indicate that the power consumption of the first application program on the terminal is abnormal, wherein the prompt information is used to cause the terminal to process a power consumption exception in the first application program, and wherein the processing the power consumption exception in the first application program comprises disabling, by one or more processors of the terminal, the first application program, restarting, by the one or more processors of the terminal, the first application program, and displaying, by the one or more processors of the terminal, information of the power consumption exception of the first application program to a user.

16. The non-transitory computer readable medium of claim 15, wherein the determining, based on the report information, whether the power consumption of the first application program on the terminal is abnormal comprises:

querying a first relationship table to obtain a power consumption range corresponding to the running information of the first application program on the terminal; and determining that the power consumption of the first application program on the terminal is abnormal in response to the power consumption of the first application program on the terminal exceeding the power consumption range corresponding to the running information of the first application program on the terminal, wherein the first relationship table is stored on a non-transitory memory coupled to the one or more processors, and the first relationship table includes a correspondence that is between the running information and the power consumption of the first application program.

17. The non-transitory computer readable medium of claim 15, wherein the determining, based on the report information, whether the power consumption of the first application program on the terminal is abnormal comprises:

determining a terminal type of the terminal based on the running information of the first application program on the terminal, wherein the terminal type comprises one of at least two terminal types, and each terminal type corresponds to one power consumption range;

determining a power consumption range corresponding to the terminal type of the terminal; and determining based on the power consumption range corresponding to the terminal type of the terminal and the power consumption of the first application program on the terminal, whether the power consumption of the first application program is abnormal.

18. The non-transitory computer readable medium of claim 17, wherein the at least two terminal types comprise a heavy running type and a light running type, wherein a power consumption range corresponding to the heavy running type of the terminal is a first power consumption range, and wherein a power consumption range corresponding to the light running type of the terminal is a second power consumption range.

19. The non-transitory computer readable medium of claim 18, wherein in response to the terminal type of the terminal being the heavy running type, the determining, based on the power consumption range corresponding to the terminal type of the terminal and the power consumption of the first application program on the terminal, whether the power consumption of the first application program on the terminal is abnormal comprises:

in response to the power consumption of the first application program on the terminal exceeding the first power consumption range, determining that the power consumption of the first application program on the terminal is abnormal.

20. The non-transitory computer readable medium of claim 18, wherein in response to the terminal type of the terminal being the light running type, the determining, based on the power consumption range corresponding to the terminal type of the terminal and the power consumption of the first application program on the terminal, whether the power consumption of the first application program on the terminal is abnormal comprises:

in response to the power consumption of the first application program on the terminal exceeding the second power consumption range, determining that the power consumption of the first application program on the terminal is abnormal.

* * * * *